Patented Sept. 8, 1936

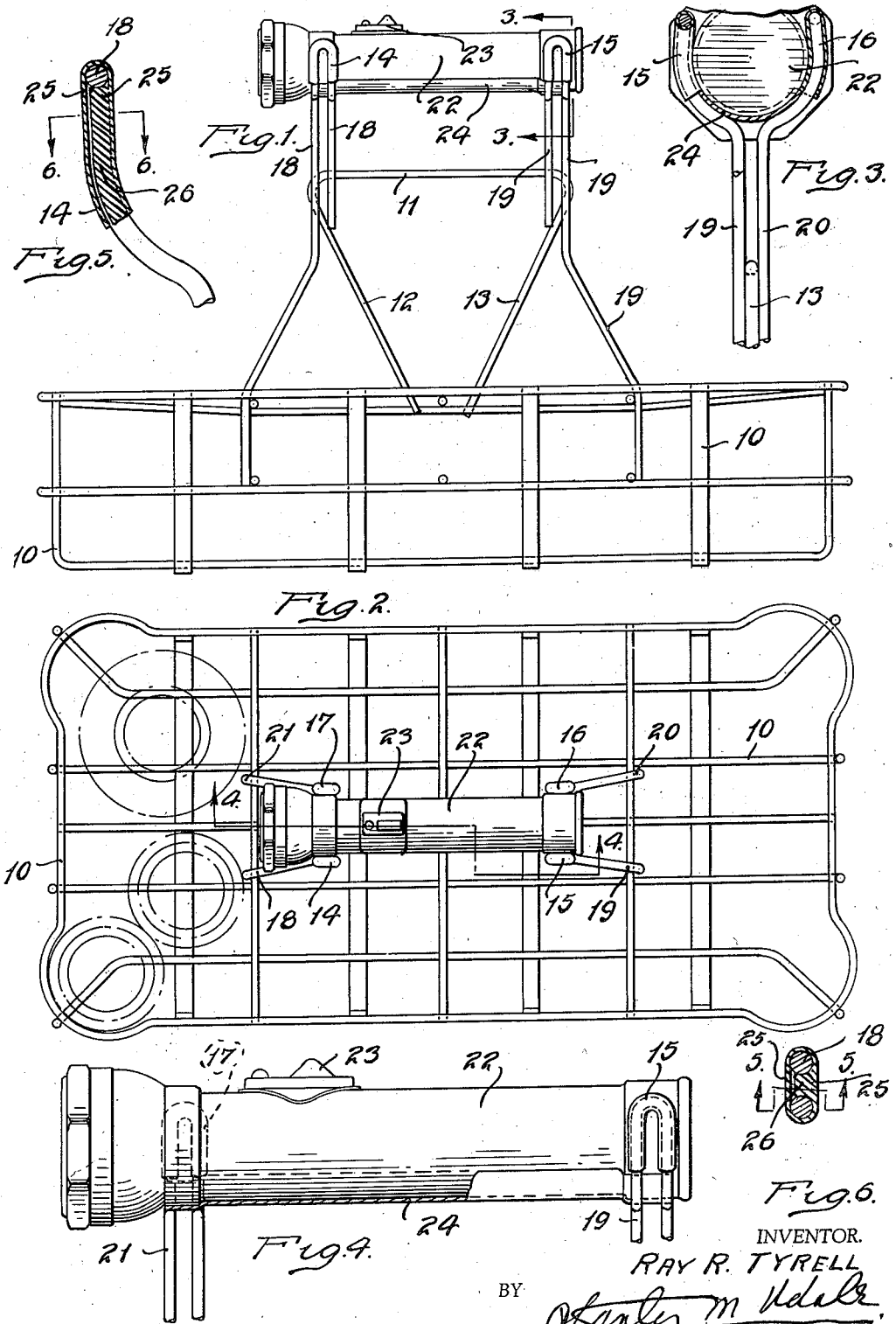

2,053,385

UNITED STATES PATENT OFFICE 2,053,385

MILK CARRIER WITH ILLUMINATING MEANS

Ray R. Tyrell, Detroit, Mich.

Application October 3, 1935, Serial No. 43,367

1 Claim. (Cl. 240—6.4)

The object of my invention is to enable a milkman to conveniently deliver milk in the dark, to locate easily the address of the party to whom the milk is to be delivered and to read easily notes left in milk bottles.

The specific object is to enable a man to carry the usual carrier with one hand and with the same hand to manipulate the switch of an electric flash-light torch, thus leaving the other hand free.

Additional objects are to permit the electric flash-light torch to be carried by the handle of the carrier and to be grasped by the same hand that holds the handle and supports the carrier.

In the figures:—

Fig. 1 shows a side elevation of the torch and carrier.

Fig. 2 shows a plan view corresponding to Fig. 1.

Fig. 3 shows a partial cross sectional elevation taken on a plane 3—3 of Fig. 1.

Fig. 4 shows a partial cross sectional elevation taken on a plane 4—4 of Fig. 2.

Fig. 5 shows a cross sectional elevation taken on a plane 5—5 of Fig. 6 of an alternate construction.

Fig. 6 shows a cross sectional plan view taken on a plane 6—6 of Fig. 5 of the alternate construction.

In Figs. 1, 2, 3, and 4:—

10 is the carrier made of flat and round wire stock and is a standard article of commerce; 11 is a tie rod connected to 10 by the wires 12 and 13. 14, 15, 16, 17 represent the rubber coated fingers formed of bent wires which extend upwardly, two from each end of the handle 11 and which form the cradle in which an electric flash-light torch 22 is detachably gripped. The bent wires which form the cores of the rubber coated fingers are the extensions of wires 18, 19, 20, 21, which extend to and are anchored by the carrier 10.

In order to carry the weight, a supporting handle is needed and a steel trough 24 is provided between the fingers 14, 15, 16, 17. The torch 22 carries a switch 23, which is accessible to the hand that grasps the trough 24.

The rubber coated fingers are formed by rubber tubes over the bent U's 14, 15, 16, 17 of the extensions from the wires 18, 19, 20, 21. The spring or yield in these extensions enable the rubber coated fingers to securely grip the torch, at the same time permitting the torch to be easily removed and replaced.

In Figs. 5 and 6 an alternative method of applying the rubber to the fingers 14, 15, 16, 17 is shown. A rubber glove 25 is snapped over the U of the wires 18, 19, 20, 21. This rubber glove consists of a flattened, open-ended tube of rubber closed at one end. Projecting from one of the flat sided walls of the tube is a projection 26, which locks the tube 25 in place on the U's of the fingers 14, 15, 16, 17. In the event that a rubber glove wears out, it can easily and cheaply be replaced.

What I claim is:—

A milk carrier with illuminating means comprising the usual portable container for individual milk bottles, a handle therefor, a cradle adapted to detachably hold an electric flash-light torch having a switch, said cradle being located immediately above said basket and connected to and supported by said container, so as to form the handle therefor.

RAY R. TYRELL.